United States Patent [19]

Schlosser

[11] Patent Number: 5,388,866
[45] Date of Patent: * Feb. 14, 1995

[54] HIGH PRESSURE COUPLING WITH PROVISION FOR PREVENTING SEPARATION OF PARTS AND WITH ANTI-GALLING PROVISION

[75] Inventor: Alvin L. Schlosser, Melville, N.Y.

[73] Assignee: Lourdes Industries, Hauppauge, N.Y.

[*] Notice: The portion of the term of this patent subsequent to Oct. 22, 2008 has been disclaimed.

[21] Appl. No.: 88,756

[22] Filed: Jul. 8, 1993

Related U.S. Application Data

[63] Continuation-in-part of Ser. No. 819,479, Jan. 10, 1992, abandoned, which is a continuation-in-part of Ser. No. 734,251, Jul. 22, 1991, abandoned, which is a continuation-in-part of Ser. No. 491,119, Mar. 9, 1990, Pat. No. 5,058,930.

[51] Int. Cl.⁶ ............................................. F16L 55/00
[52] U.S. Cl. ........................................ 285/92; 285/94; 285/319; 285/921; 411/223; 411/121
[58] Field of Search ............... 285/92, 94, 319, 320, 285/921; 411/222, 223, 229, 232, 235, 237, 119, 120, 121

[56] References Cited

U.S. PATENT DOCUMENTS

| 763,317 | 6/1904 | Nelson. | |
|---|---|---|---|
| 1,155,858 | 10/1915 | Wines. | |
| 1,914,736 | 6/1933 | Coutu. | |
| 2,419,702 | 4/1947 | Barnes. | |
| 2,420,778 | 5/1947 | Herold. | |
| 2,523,578 | 9/1950 | Lewis. | |
| 3,053,357 | 9/1962 | Stanger. | |
| 3,135,537 | 6/1964 | Scott | 285/341 |
| 3,167,105 | 1/1965 | Rosan | 151/11 |
| 3,385,613 | 5/1968 | McCall | 285/84 |
| 3,418,010 | 12/1968 | Buckner | 285/92 |
| 3,807,774 | 4/1974 | Heath. | |
| 3,915,478 | 10/1975 | Al | 285/45 |
| 4,150,845 | 4/1979 | Riuli | 285/81 |
| 4,451,069 | 5/1984 | Melone | 285/56 |
| 4,616,855 | 10/1986 | Kuhle | 285/24 |
| 4,693,498 | 9/1987 | Baugh | 285/39 |
| 4,705,302 | 11/1987 | Beiley | 285/247 |
| 4,822,078 | 4/1989 | Snelling | 285/10 |
| 4,846,508 | 7/1989 | Pallini | 285/175 |
| 5,048,872 | 11/1991 | Gehring | 285/92 |
| 5,064,224 | 11/1991 | Tai | 285/94 |
| 5,065,787 | 11/1991 | Lochmann | 137/315 |
| 5,083,819 | 1/1992 | Bynum | 285/89 |
| 5,094,491 | 3/1992 | Berghammer | 285/92 |
| 5,101,906 | 4/1992 | Carlin | 166/380 |
| 5,106,130 | 4/1992 | Ellsworth | 285/355 |
| 5,110,158 | 5/1992 | Sabo | 285/92 |
| 5,127,679 | 7/1992 | Poupier | 285/92 |
| 5,127,680 | 7/1992 | Takei | 285/94 |
| 5,131,689 | 7/1992 | Bates | 285/87 |
| 5,131,690 | 7/1992 | Mano | 285/92 |
| 5,139,289 | 8/1992 | Koss | 285/80 |
| 5,156,421 | 10/1992 | Chauvel | 285/40 |

FOREIGN PATENT DOCUMENTS 340194 2/1989 European Pat. Off. .
624386 8/1949 United Kingdom .

Primary Examiner—Randolph A. Reese
Assistant Examiner—Heather Chun Shackelford
Attorney, Agent, or Firm—Ladas & Parry

[57] ABSTRACT

A high pressure fitting is provided .which comprises an adjustment nut with nipples extending therefrom in axial extension of one another. The nipples are provided with exterior threads and with conically shaped ends which are respectively engaged by ferrules. Each of these ferrules is engaged by a coupling member having an interior thread which is in engagement with the threads provided on the associated nipple. Adjustment of the threads operates to pull the ferrules against the associated nipples. On each nipple is mounted a frusto-conical ramp adjacent which is provided a cylindrical arrangement of spaced fingers or a thin wall cylinder having protruding tips directed radially inwards. These fingers or the cylinder with their respective tips ride up the ramps and are loosely accommodated in their respectively associated nipples to prevent accidental detachment thereof. The fingers pressing against the ramps serve to vector forces to remove play from between the inter-engaged threads. In some embodiments, the ferrule can be omitted.

42 Claims, 8 Drawing Sheets

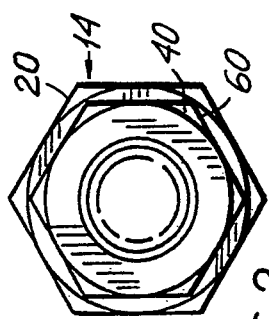
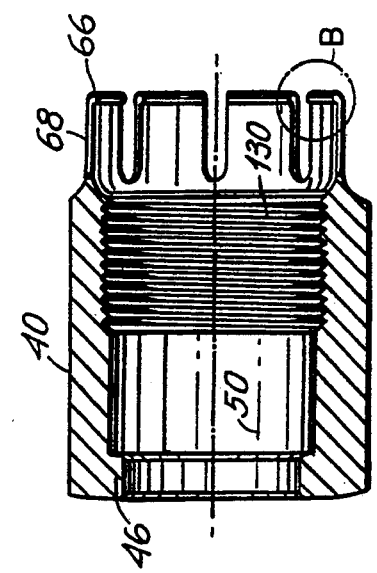
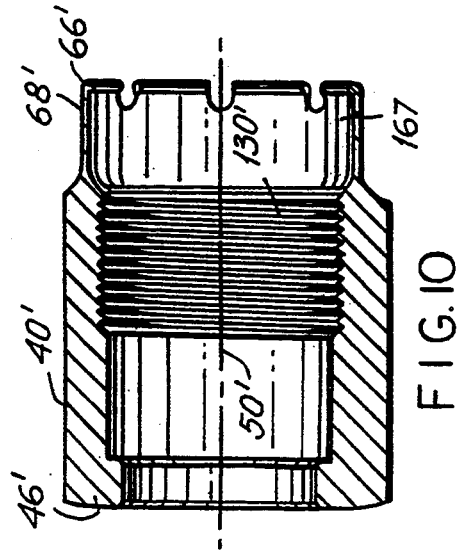
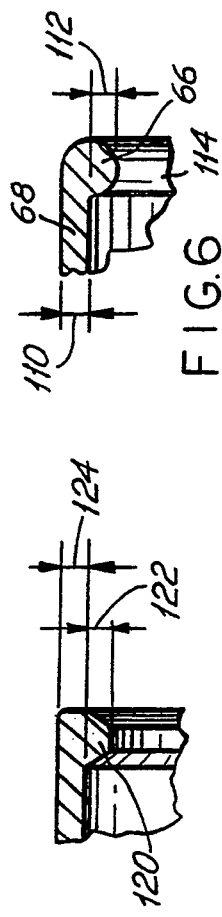
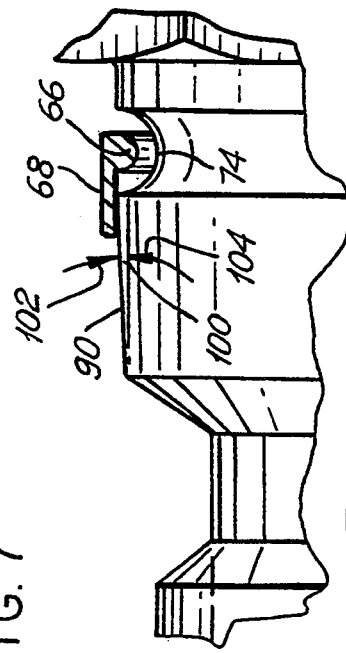
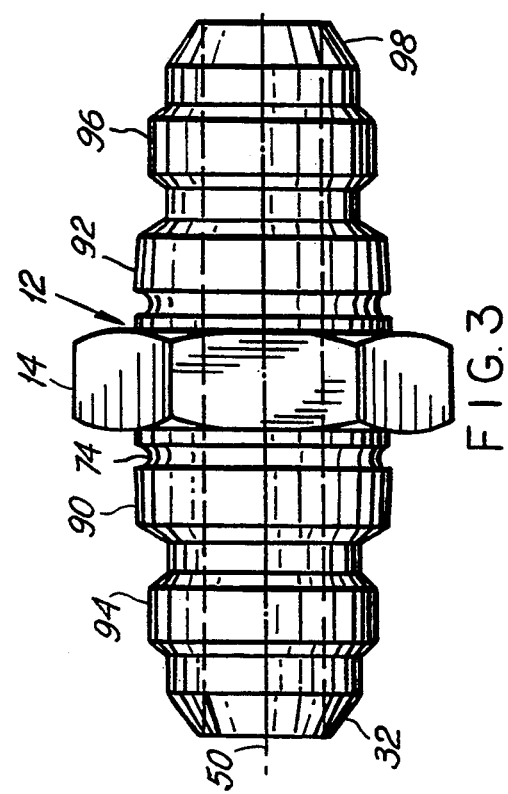

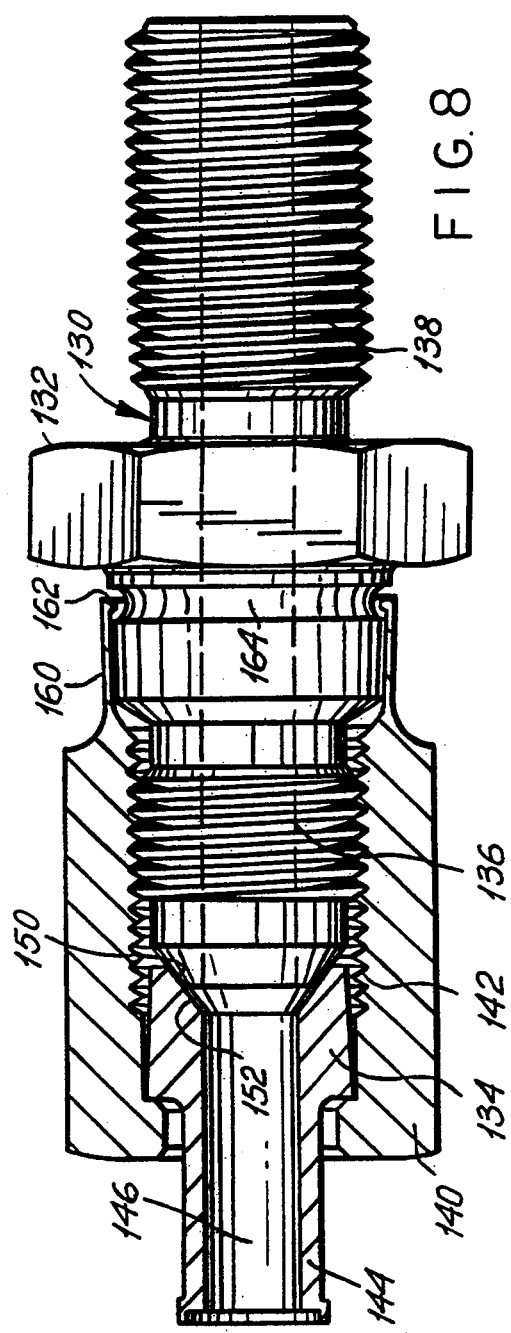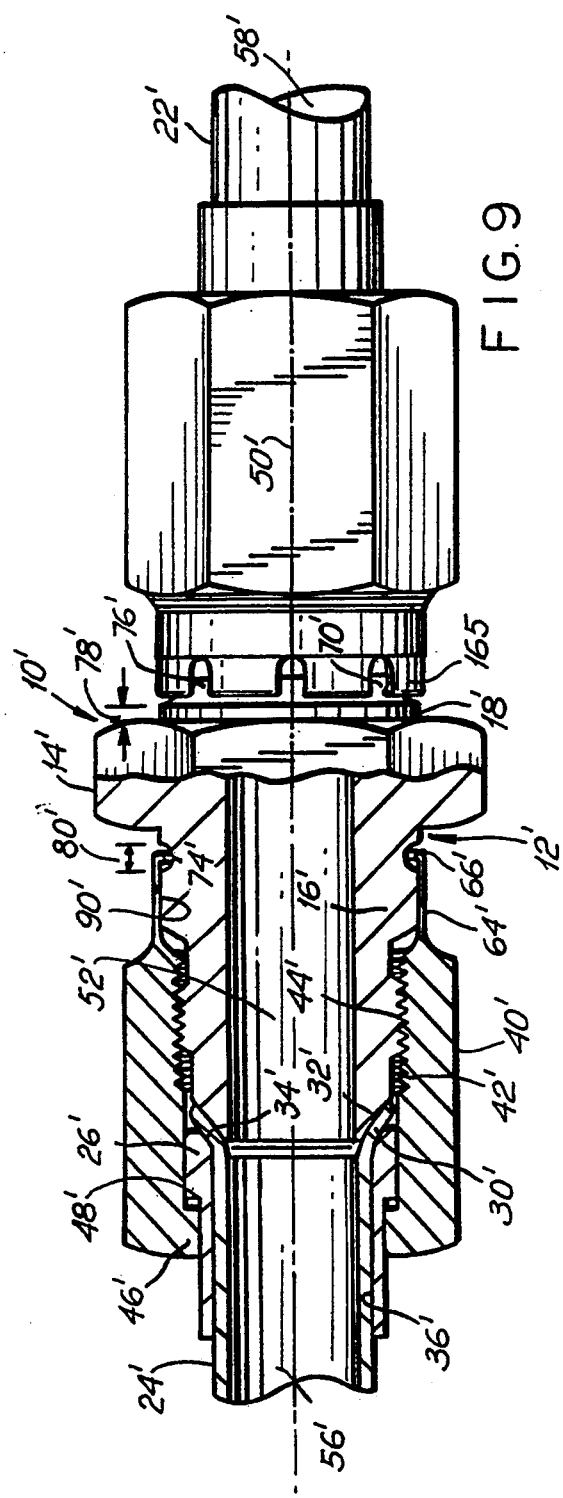

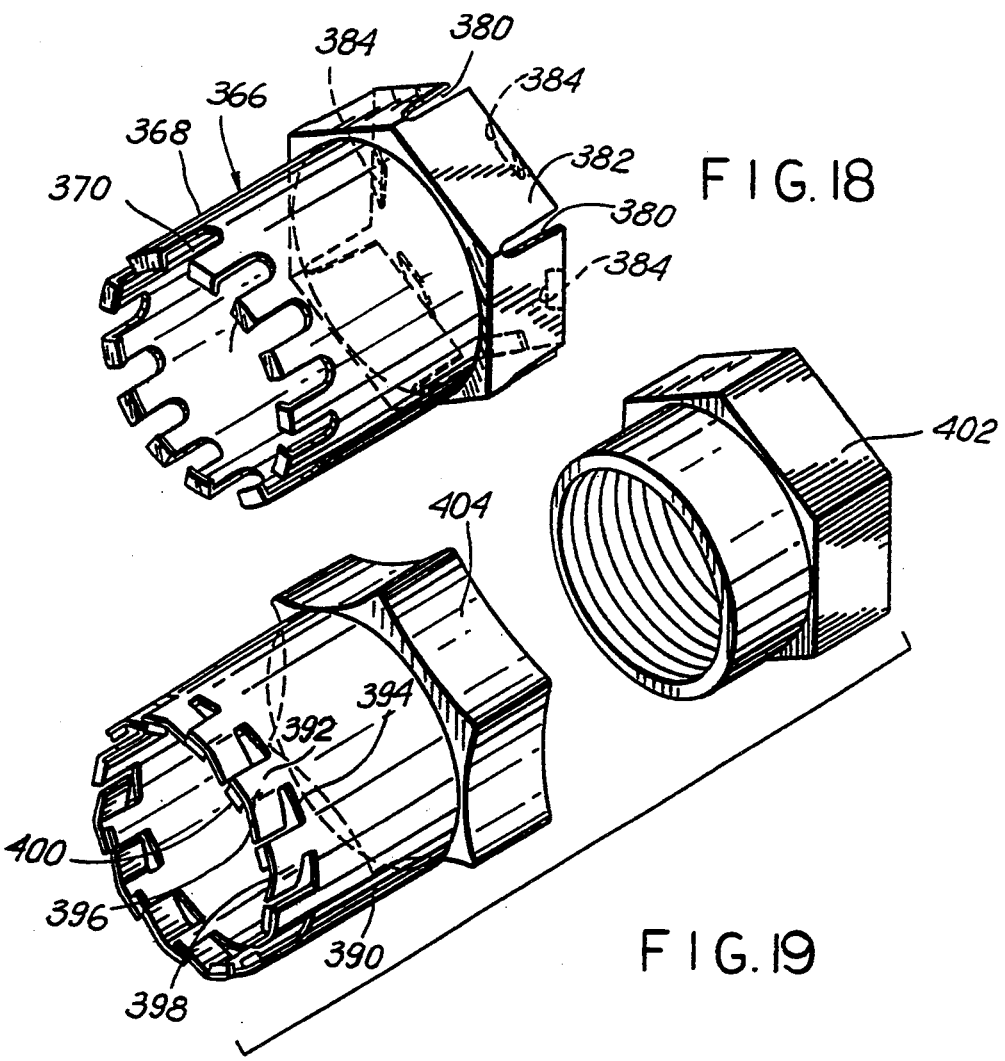
FIG. 18
FIG. 19
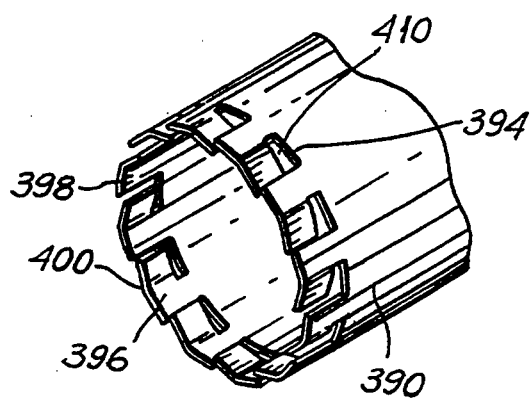
FIG. 20

HIGH PRESSURE COUPLING WITH PROVISION FOR PREVENTING SEPARATION OF PARTS AND WITH ANTI-GALLING PROVISION

This is a continuation-in-part of my earlier application Ser. No. 07/819,479 filed Jan. 10, 1992 and abandoned Jul. 16, 1993, which is a continuation-in-part of my earlier application Ser. No. 07/734,251 filed Jul. 22, 1991 and abandoned Jun. 21, 1993, which is a continuation-in-part of my earlier application Ser. No.; 07/491,119 filed Mar. 9, 1990, (now U.S. Pat. No. 5,058,930 issued Oct. 22, 1991).

FIELD OF INVENTION

This invention relates to fittings such as couplings, tee's, elbows, crosses and so forth and more particularly to high pressure fittings suitable for high pressure pneumatic or hydraulic circuits and the like.

BACKGROUND

For purposes of providing fittings in high pressure fluid circuits and the like, use has been made of wired fittings to lock parts together to prevent the decoupling thereof during operation. Such devices are known as lockwire fluid fittings and one such device is disclosed in U.S. Pat. No. 3,807,774 (Joseph W. Heath, Jr.) which issued Apr. 30, 1974. Therein are disclosed separate hydraulic fittings which are connected together by nuts at least one of which is engaged by a wire in order to prevent separation of these components during operation. Such an arrangement is especially useful in aircraft wherein operation under conditions of high pressure and vibration sometimes result in the separation of parts to the detriment of satisfactory operation of the aircraft in which such a fitting is incorporated.

In an investigation of the novelty of the present invention, a number of patents have been found. These include U.S. Pat. Nos. 2,419,702 (F. A. Barnes); 2,420,778 (R. E. Herold); 3,053,357 (W. E. Stanger); 3,915,478 (Al et al); and 4,451,069 (Melone).

The Barnes U.S. Pat. No. 2,419,702 reveals the use of a coupling member to connect two members together. There is a provision for the striking out and peening over a tongue from the metal of the coupling member. The tongue prevents unscrewing of one part from another. There is, however, no suggestion in this patent of a ramp providing for the taking of play out of and adding frictional tongue to resist unlocking of a threaded engagement.

The Melone U.S. Pat. No. 4,451,069 is provided with cantilevers which bear bulbous tips adapted for being accommodated in an annular groove. A plurality of fingers are provided which are in cylindrical arrangement, the fingers being separated by respective slots. The bulbous tip of each finger is accommodated loosely in the associated annular groove.

The Herold U.S. Pat. No. 2,420,778 reveals the use of coupling member to bring about engagement between axially displaceable parts. Therein, a tube is clamped between one part and an external sleeve to provide what looks like a ramp type engagement but which actually is unlike the ramp type engagement discussed hereinbelow.

The Al et al U.S. Pat. No. 3,915,478 includes an external sleeve for threadably engaging an interior sleeve such as to provide a coupling for a compression-type pipe. The coating terminates in a thread formation of composition tandemly juxtaposed and comprising an extension of metal thread thereon.

The Stanger U.S. Pat. No. 3,053,357 indicates a design consisting of a circular arrangement of cantilever like fingers with bulbous tips. The bulbous tips are accommodated loosely in an annular slot arrangement. There is, however, no threaded engagement which is enhanced by the engagement of a frusto-conical ramp by a circular arrangement as discussed below.

In addition to the foregoing, a number of additional patents have been considered. These include U.S. Pat. Nos. 763,317 (L. R. Nelson) of Jun. 21, 1904; 1,914,736 (A. J. Coutu) of Jun. 20, 1933; and 3,418,010 (W. G. Buckner) of Dec. 24, 1968.

In U.S. Pat. No. 763,317, L. R. Nelson discloses a hose coupling wherein pawls are employed to provide a locking member for locking two components together thereby preventing axial displacement between the same.

In U.S. Pat. No. 1,914,736, A. J. Coutu discloses an angular ball swivel union wherein a spring is employed to prevent rotational displacement between two elements which are threadably engaged.

W. G. Buckner discloses in U.S. Pat. No. 3,418,010 an attaching device wherein threaded engagement of a nut on a fitting provides for engagement of a sleeve having a tapered shoulder which is engaged by an inclined wall of the nut in such a manner as to provide engagement of an associated tube.

None of the aforesaid patents discloses a fitting, suitable for operation in high pressure fluid circuits and the like, which provides for locking parts together without the use of wire connectors while additionally providing for improving the inter-engagement between threadably coupled components.

SUMMARY OF INVENTION

It is an object of the invention to provide a fitting for a fluid or pneumatic circuit or the like which provides improvements over lockwired and other known fittings and which is generally an improved high pressure fitting.

It is further object of the invention to provide an improved coupling which prevents the separation of pads during operation particularly under conditions of high pressure and/or vibration.

It is still another object of the invention to provide an improved fitting which is capable of thousands of re-uses, since neither installation loads or operational loads exceed the yield strength of the material.

It is a further object of the invention to provide an improved fitting, the design features of which are useful for materials in the temperature range of 1100 degrees F. or higher down to cryogenic temperatures.

It is yet another object of the invention to provide an improved high pressure fitting which functions additionally to prevent leaks therein.

Yet another object Of the invention is to provide an improved fitting having universal application as regards size thereby to minimize inventory requirements.

Still another object of the invention is provide an improved fitting which can be manufactured by the utilization of mass production techniques and which is relatively inexpensive, without the sacrifice of high quality functioning.

It is a further object of the invention to provide an improved fitting which, without the use of lockwires, operates in a positive manner to prevent the separation of parts.

Still another object of the invention is to provide an improved high pressure fitting which is readily inspected to confirm that a positive connection has been effected.

Still a further object of the invention is to provide an improved fitting which avoids the need for time consuming installations and which furthermore makes possible installations which would not be possible with the use of lockwires or the like.

Still another object of the invention is to provide an improved high pressure fitting which is rugged in construction and can operate without failure in conditions of high temperature, high pressure and extreme vibration.

Another object of the invention is to provide an improved fitting having minimized fretting or galling potential.

Still another object of the invention is to provide an improved high pressure fitting which is reusable and which does not require special tools or support equipment.

Yet another object of the invention is to provide an improved fitting which is readily repairable and/or replaceable.

Yet another object of the invention is to provide an improved connection or joint which avoids safety or mission critical events and which incorporates a locking feature which provides a means of easily verifying functional integrity.

In achieving the above and other objects of the invention, there is provided a fitting having a ramp and an arrangement adapted for riding up the ramp. The arrangement presses against the ramp to urge a combination of threads together and minimize play and provide untorquing resistance.

Additionally, the arrangement can be, for example, a cantilever arrangement or a thin wall barrel with short slots. The barrel, as machined, provides an interference fit when assembled to the ramp. This barrel presses against the ramp to urge the threads together, minimize play, and provide the aforementioned untorquing resistance.

According to a feature of the invention, there is provided a depression adjacent the ramp. The cantilever arrangement, for example, includes at least one tip adapted for riding up the ramp and being received in loose relationship in the aforementioned depression. As will be shown, the cantilever arrangement presses against the ramp when the tip is received in the depression.

The depression mentioned above is preferably provided in the form of an annular groove with the ramp being preferably of frusto-conical conformation. The alternate thin wall cylinder arrangement will preferably, in accordance with the invention, include a cylindrical arrangement to have facing surfaces at least one of which is coated with a lubricant. The lubricant as will be discussed in greater detail hereinbelow may, for example, be molybdenum disulfide and graphite provided in a silicate binder or the like. The aforesaid cylinder which operates in conjunction with this lubricant will preferably have a tensile yield strength in the order of magnitude of at least about 140,000 p.s.i. for metals.

The length of the aforesaid fingers is minimized (optimized) by using the ratio of the modulus of elasticity divided by the allowable tensile bending stress for the material. This ratio, with a safety factor included, for minimized finger length will vary between about 200 to 100.

As will also be shown hereinbelow, the fitting mentioned above may include a nipple having a conical end and a bore having a conical extremity. The conical end is received in the conical extremity of the aforementioned bore. Furthermore, the fitting may include a protrusion to pull the conical end of the nipple toward and into the conical end of the bore.

In another sense the invention may be regarded as providing a fitting comprising first and second members including interengaged first and second threads. The first member includes a ramp and the second member includes an arrangement adapted by adjustment of the interengaged threads to generate a force to maintain the threads in tightly engaged relationship whereby to avoid play between the threads. The invention may further be regarded as providing the members in such form as to include generally tubular members having a common axis of symmetry. Preferably, the ramp will have a surface of generally truncated conical shape having a base. The first member is provided with a recess adjacent this base and the second member preferably includes at least one radially extending part arranged at least partly radially relative to the axis of symmetry to be received in the recess with the tubular member bearing against the ramp.

According to a further embodiment of the invention, the tubular members of the first and second members will preferably include facing conical surfaces having a proximity controlled by adjustment of the interengaged threads. A tube will be incorporated into the fitting including an end portion entrapped between the conical surfaces with the radially extending part being received in the recess. It is preferred that the threads, ramp and conical surfaces be coaxially arranged relative to the axis of symmetry. It is moreover preferred that the recess be provided in the form of an annular groove. According to a preferred version, a dry lubricant is provided on one of the aforementioned conical surfaces between the same and the associated tube.

In accordance with yet another embodiment of the invention, the aforementioned recess is in the form of a toothed annular groove including teeth defining notches therebetween. It will be seen in the detailed description which follows hereinbelow that the radially extending part is adapted for being received in these notches. It is preferred that these notches be arranged so as to be parallel to the axis of symmetry.

According to yet another feature of the invention the second member includes a cylindrical barrel including an end portion provided with parallel slots. The end portion will include axially aligned cantilever fingers between these slots and the fingers will include radially extending pads (inclusive of the first said radially extending part) received in the aforementioned notches to restrict relative rotation between the first and second members. As will also been seen in the following description, the parallel slots are of a relatively shallow depth and the barrel engages the ramp when the radially extending parts are accommodated in the aforementioned notches. The cylindrical barrel functions most suitably under certain conditions of stress, barrel wall thickness and so forth as will be shown in detail hereinbelow.

According to yet another embodiment of the invention, a ferrule may be provided between the first and second members with the ferrule and first member including facing conical surfaces. The second member is provided in such a manner as to engage the ferrule and is responsive to adjustment of the aforementioned threads to displace the conical surface on the ferrule towards engagement with the facing conical surface on the first member. In this embodiment, a tube is directly connected to the ferrule and defines therewith a continuous bore through which liquid or pneumatic medium can be displaced. The tube and ferrule may be connected in endwise abutting relationship.

According to still another embodiment of the invention, the second member mentioned above may include a main section provided with an endwise opening recess and an auxiliary section separate from the main section and located in the endwise opening recess. The auxiliary section supports the arrangement for generating the force and enables the radially extending part to be received in the recess in the first member. In a preferred version, the main section will be provided with a polygonal periphery concentric on the aforesaid axis to facilitate adjustment of the threads. Moreover, the main and auxiliary sections will preferably abut along a plane which is perpendicular to the aforesaid axis of symmetry. As will be explained in further detail hereinbelow, the radially extending pads may preferably include serrated extremities for engaging the teeth in the annular groove.

According to yet another embodiment of the invention the second member may include first and second separate parts with the first part including the aforementioned second thread in the form of an interior thread. The second part will then include a circular array of radially extending parts including the first mentioned radially extending part. As will be discussed in greater detail hereinbelow, the first part is provided with an annular groove with the second pads including a protrusion to engage in the annular groove in the first part to hold the first and second parts together.

Still another embodiment of the invention requires that the aforementioned protrusion be provided as one of a plurality of tabs on the second part, these tabs engaging in the annular groove in the first part. In this embodiment of the invention, the second part may be provided with a plurality of slots between the tabs to enable the tabs to snap into the annular groove in the first part thereby to lock the parts together.

A further version of a structure provided in accordance with the invention will include a circular arrangement of flags adapted to extend into the above mentioned recess, these flags sloping in the same circumferential direction to engage in the aforementioned recess. These flags may include staffs in extension of the tubular member of the second member, these staffs being connected to the latter said tubular member. All flags will extend to generally the same extent into the aforementioned recess.

The tubular member of the second member may preferably include a diametrically and circumferentially stretchable barrel adapted to ride up the aforementioned ramp. This barrel may be of metal or plastic. More particularly the barrel may be of Inconel, titanium, aluminum, Torlon, PEEK, Valox or Vespel.

In some of the aforesaid embodiments, the flags may include tabs extending radially towards the abovementioned axis of symmetry. Additionally, the tubular member of the second member may include two sections one of which is provided with a polygonal periphery and other of which is provided with a matching polygonal bore. Said polygonal periphery extends into the polygonal bore in order to lock these sections rotationally together.

Other objects, features and advantages of the invention will be found in the detailed description which follows hereinbelow as illustrated in the accompanying drawing.

BRIEF DESCRIPTION OF DRAWING

In the drawing:

FIG. 2 is an end view of the coupling of FIG. 1;

FIG. 3 is a side view of a central barrel constituting a part of the coupling of FIG. 1 prior to a threading of the same;

FIG. 4 illustrates on enlarged scale a detail of the barrel of FIG. 3;

FIG. 5 illustrates in section a component of the coupling of FIG. 1;

FIG. 6 shows on enlarged scale a detail of the component of FIG. 5;

FIG. 7 illustrates an alternative configuration of the detail of FIG. 6;

FIG. 8 illustrates a modification of the coupling of FIG. 1;

FIG. 9 is a side view, partially in section, of a high pressure coupling provided in accordance with another embodiment of the invention (thin-wall cylinder), a portion of a fluid circuit being shown in phantom lines;

FIG. 10 illustrates in section a component (thin wall cylinder) of the coupling of FIG. 9;

FIG. 18 is a diagrammatical generally perspective view of a component of the embodiment of FIG. 17;

FIG. 19 is an exploded diagrammatical view of a two-piece nut component capable of being employed with various embodiments of the invention;

FIG. 20 is an exploded diagrammatic perspective of a variation of FIG. 19;

DETAILED DESCRIPTION

Figure 1:
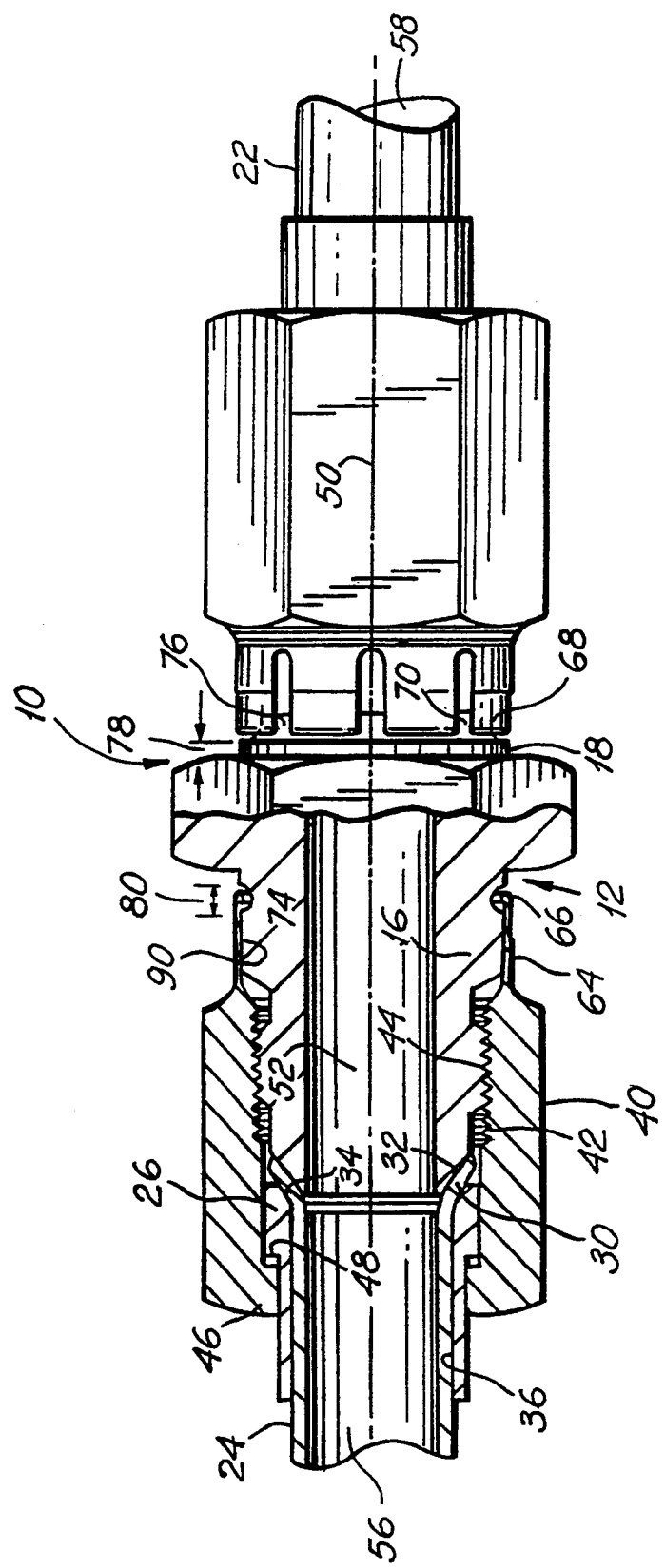
FIG. 1 is a side view, partially in section, of a high pressure coupling provided in accordance with one embodiment of the invention, a portion of a fluid circuit being shown in phantom lines.

A high pressure fitting or coupling provided in accordance with the invention is illustrated in the drawing. It provides a positive locking while preventing the separation of pads or components and while avoiding the possibility that loose pads can become detached under conditions of high pressure, high temperature and high magnitude of vibration. The fitting of the invention is rugged and provides for minimizing fretting or galling potential. The fitting or joint of the invention is characterized by the provision of a relatively thin wall continuous cylinder or a cylindrical arrangement of fingers extended from the end of a nut or coupling component, the wall or finger terminating in a spring loaded bulb which falls into a groove after having been driven up a ramp. The joint of this embodiment of the invention requires a nut, nipple and ferrule. These can also be provided in relative mirror image of one another. The joint of this embodiment of the invention is readily manufactured of a high temperature material such as Inconel 718, A-286, Titanium 6AL4V, or the like. It is provided with a tapered friction lock preload on a thin wall which rides up a ramp to provide additional vibration resistance. As will be noted, the tapered surfaces on the nut and nipple are coated with a lubricant or plating or the like which facilitates installation and which is capable of functioning under conditions of high temperature, high pressure and extreme and extreme magnitudes of vibration. In a lower temperature application, the same features, either thin wall cylinder or fingers, can be provided at lighter weight and cost, using high strength aluminum, such a 7075-T651.

The fitting in FIG. 1 is indicated at 10. It includes a barrel 12 including a centrally located nut or wrenching polygon 14 having coaxial nipples 16 and 18 extending in opposite directions therefrom. As seen in FIG. 2 the nut 14 has a polygonal surface 20 externally located thereon and providing for engagement by a tightening tool of commercially available type.

Referring to FIG. 1, a portion of the associated fluid circuit or the like is indicated at 22 and 24. This portion of the fluid circuit may consist of sections of a high pressure tube/hose to be coupled to one another. In order to accomplish this, each nipple has associated therewith a ferrule such as indicated at 26. Thus, for example, nipple 16 and ferrule 26 constitute first and second pads which are axially displaceable relative to one another in order to accomplish the purpose of providing a high pressure coupling or fitting. In the illustrated embodiment of FIG. 1, the end of the tube/hose section 24 is indicated at 30. It is entrapped between the conical end 32 of the nipple 16 and conical extremity 34 of the bore 36 of the ferrule 26. A like arrangement is possible with respect to the tube/hose 22.

The high pressure fitting of this embodiment of the invention moreover comprises a coupling component 40. It has an interior thread indicated at 42. This thread engages an exterior thread 44 of nipple 16. Component 40 is provided with an inwardly extending projection 46. The function of this inwardly extending projection 46 is to cup around a shoulder 48 provided on ferrule 26 whereby an axial force will be exerted against this shoulder dependent upon adjustment of the engagement between the threads 42 and 44.

The high pressure fitting of this embodiment of the invention is preferably symmetrical around an axis 50 which is centrally located in the bore 52 which extends completely through the fitting thereby to provide a fluid connection between the bore 56 tube/hose 24 and the bore 58 of tube/hose 22. As is seen in FIG. 2, the coupling component 40 has an external surface 60 which also has the configuration of a polygon (FIG. 2) thereby to facilitate engagement by a tightening tool. Preferably the same type of tool is capable of engaging both the surface 20 and the surface 60.

As will be discussed in greater detail hereinbelow, the coupling component 40 is provided with a thin wall cylindrical extension or cantilever arrangement 64 terminating in a bulbous inwardly extending tip 66. The cantilever arrangement 64 consists of a plurality of fingers such as indicated at 68. These fingers are separated by slots 70 (whose length depends on the associated material, its thickness and lift), thereby giving rise to the cantilever nature of the finger structure. The fingers 68 are resilient and the bulbous tips of these fingers are intended to be accommodated in annular groove or depression indicated at 74. The annular grooves 74 and 76 are concentric with one another and with axis 50 and are spaced from the nut 14 by a distance indicated at 78, this distance being less than the breadth of the associated annular groove which breadth is indicated, by way of example, at 80.

As will be discussed in greater detail hereinbelow, during installation, the bulbous tips or the like indicated at 66 ride up the associated ramp 90 which is fashioned in the nature of a frusto-conical surface. The tips 66 keep the thin walls 64 spaced from the ramp until the tips 66 ride over the ramp end and drop from the same to be accommodated loosely in the associated annular groove. The fingers 68 pressing against the associated ramp vector the forces applying to the same (due to the resilient nature of the fingers) thereby to provide for a tight engagement of the threads 42 and 44. This minimizes the effects of vibration thereupon. To facilitate the installation operation and to enhance the anti-fretting and anti-galling function, the fingers, tips and ramp are preferably provided with a lubricant coating or surface or a plating (functioning as a lubricant) discussed more fully below.

FIG. 3 illustrates the central barrel 12 of the high pressure rifling of FIG. 1 prior to a threading thereof. Therein it car, be seen that the barrel consists of the aforementioned ramp 90, a ramp 92 being provided in mirror image thereof. The barrel moreover consists of the nut 14 of polygonal conformation as has been discussed hereinabove. It further consists of two lands 94 and 96 also provided in mirror image of one another and symmetrically arranged about the axis 50 mentioned hereinabove., These lands 94 and 96 are provided with the above-mentioned threads 44 (see FIG. 1) which are similarly concentric about the axis 50. The ends of the component 12 constitute nipples having frusto-conical surfaces 32 and 98 which cooperate with respective ferrules in order to provide a clamping action on hose extremities as mentioned hereinabove. A direct contact between the conical extremities of these nipples and the conical receptacles in the ferrules is also possible as will be discussed hereinbelow.

The ramp 90 which constitutes an important feature of the invention is illustrated on enlarged scale in FIG. 4. In FIG. 4 is shown an illustrative finger 68 having a bulbous tip 66 which is directed radially inwards with respect to the overall structure. As will be seen in FIG. 4 the tip 66 is loosely accommodated in annular groove 74, the tip having dropped off the ramp 90 after riding up and beyond the same. The angle of the ramp which is a frusto-conical surface is indicated at 100 is defined between arrows 102 and 104. This angle is preferably an angle in the order of magnitude of about 2 degrees ±30′. The ramp 90 and preferably also the fingers 68 are provided with confronting surfaces which are eventually interengaged and which both are preferably provided (along with tips 66) with a lubricant or lubricant coating or plating. One such lubricant preferred for anti-galling is a lubricant supplied by E/M Corporation of New Britain, Conn. The product is preferably that designed as Everlub 811 which satisfies the requirements of MIL-L81329A. The lubricating pigments therein are molybdenum disulfide and graphite which are in a silicate binder. The recommended effective lubricating temperature range thereof is minus 365 degrees F. to plus 1200 degrees F. A similar lubricant which can serve a suitable purpose in fittings of the invention is Esnalube 382 which also employs a molybedenum disulfide lubricating pigment in a silicate binder. It has an effective lubricating temperature of minus 365 degrees F. to plus 800 degrees F. Other solid film lubricants are available. Additionally, metal platings such as, for example, silver are also useful in the prevention of galling.

A preferred material for the high temperature (approximately 1000 degrees F.) barrel, ferrule and coupling component is, by way of example, Inconel 718 having a hardness of 45–47 on the Rockwell "C" scale. This material has a room temperature tensile yield strength of approximately 165,000 p.s.i. Similar results for lower temperature operation (to approximately 600 degrees F.) can be obtained using titanium 6AL4V, or for temperatures to approximately 300 degrees F., 7075-T651 or other high strength aluminum. The room temperature yield strength of titanium 6AL4V is approximately 145,000 p.s.i., while that of aluminum 7075-T651 is 75,000 p.s.i.

The cylindrical arrangement of fingers or leaf springs on the coupling component requires a material of highest practical tensile strength at the specified operating temperature which will produce the smallest and lightest fitting set. Inconel 718 suits this purpose. Barrels formed of Inconel 718 which are strain hardened and heat treated may have a room temperature yield strength of approximately 200,000 p.s.i. and will allow the utilization of smaller barrels and fittings than the untreated Inconel 718 1000 degree F. application.

One purpose of the bulbous tips at the ends of the fingers projecting radially inwards and operating in conjunction with the annular grooves 74 and 76 is to prevent separation. This separation is intended to mean a complete disconnecting of the coupling component from the barrel which in turn would cause a catastrophic leakage of fluid at the joint. The proper length of the slots 70 is a function of the nut or barrel material and its thickness and yield strength versus the maximum deflection when the bulbous tips slide up the frusto-conical ramp of the fitting. In the preferred design, the ramp as mentioned above has an angle of about 2 degrees ±30′. It has been found, however, that a 0.5 degree ramp with a lift of approximately 0.001 to 0.003 inches is satisfactory to achieve the objectives of the invention with a slot depth of about 0.220 inches and with a wall thickness of 0.010 inches. These dimensions represent illustrative orders of magnitude to be employed in accordance with a preferred embodiment of the invention.

FIG. 5 illustrates, in greater detail, the configuration of the coupling component 40 with its shoulder 46. In FIG. 5 is seen the thin wall cantilever section 68 with an illustrative bulbous, inwardly directed tip 66. FIG. 6 illustrates, on an enlarged scale; details from section B of FIG. 5. In FIG. 6 appear the thin wall 68 and the bulbous tip 66. The thickness dimension of the wall is indicated at 110, this being in the order of magnitude of about 0.010 inches. The inward projection of the bulbous tip is indicated at 112, this dimension being in the order of magnitude also of about 0.010 inches. The diameter of the bulbous tip is indicated at 114, this diameter being in the order of magnitude of about 0.020 inches.

Although a bulbous tip has been illustrated as the preferred embodiment a variant of this shape appears in FIG. 7 whereat it is seen that the conformation of the tip indicated at 120 is that of a trapezoid in cross section. The inward protrusion of this tip is indicated at 122 and is in the order of magnitude of 0.010 inches with the wall thickness being indicated at 124, this being in the order of magnitude of about 0.010 inches. The internal thread of the coupling component is indicated in greater detail at 130 in FIG. 5. The thread has the purpose, as mentioned hereinabove, of engaging the exterior thread on the barrel 12 (see FIG. 1). These threads are coaxial relative to the axis 50 of the overall structure.

FIG. 8 shows a variant of the coupling arrangement discussed above relative to FIG. 1. The coupling arrangement of FIG. 8 includes a barrel 130 having a nut 132 as described above. The structure of FIG. 8 furthermore includes a ferrule such as indicated at 134. The barrel is threaded as indicated at 136 and 138 and an illustrative coupling member 140 is indicated as having a cooperating thread 142 on the interior bore thereof.

In this embodiment of the invention, the coupling member 140 engages a ferrule 134 circuit having an interior bore 146 constituting a part of the fluid circuit in which the coupling operates to provide a leak proof joint under extreme conditions of heat, vibration and pressure; In the illustrated embodiment, provision is made for a direct contact between the conical surfaces 150 and 152 thereby to provide a fluid tight connection. A resilient material (not shown) of suitable strength can be employed between these confronting surface if desired. , In the embodiment of the invention illustrated in FIG. 8 there is once again provided a cylindrical arrangement of cantilever fingers indicated at 160. These fingers have inwardly projecting tips indicated at 162 accommodated in an annular groove or depression indicated at 164.

From what has been described above, it will now be understood that one embodiment of the invention provides a coupling which includes first and second axially displaceable pads, the first pad including an exterior thread with a coupling component encircling these pads and including an interior thread to engage the exterior thread of the barrel. While these threads may be subject to a limited play therebetween, the coupling component forces the pads together responsive to adjustment of the engagement between the threads. The first pad is provided with a ramp with the coupling component including a cantilever arrangement pressing against the ramp to urge the threads together and minimize the play therebetween. The provision of inwardly projecting tips (which ride up the ramp to drop into and be accommodated within an annular groove or depression) locks the pads together so that separation of these pads from one another is minimized if not completely avoided.

By way of example, the length of a nipple in the aforegoing embodiments may be about 1.8 to 2.2 inches with the diameter of the bore therethrough being about 0.280 to 0.320 inches. The average diameter of the frustro-conical ramp may, for example be about 0.580 to 0.630 inches with the nipple taper at the end being about 35 to 40 degrees. Other dimensions are also possible within the scope of the invention. The above dimensions apply to a ⅜" outside diameter tube connection. Other tubes will have larger or smaller dimensions as preferred.

FIGS. 9 and 10 show a further embodiment of the invention with parts corresponding to those FIGS. 1-8 being indicated by primed numbers. The embodiment of FIGS. 9 and 10 is essentially a structure employing a thin wall cylinder 165 or 167, provided with shorter slots 76' (e.g., with a length of approximately 0.080 inches). The thin wall thickness lies in a range of about 0.007–0.020 inches and preferably is in the, order of magnitude of about 0.010 inches. In this case, the cylinder proceeds up the ramp, expanding as required, until the bulbous tips drop over the ramp edge into the associated annular groove.

The invention may be considered as providing a fitting including first and second members including interengaged first and second threads. In this combination, the first member includes a ramp and the second member includes an arrangement adapted by adjustment of the interengaged threads for being brought to bear against the aforementioned ramp to generate a force to maintain the threads in tightly engaged relationship thereby to avoid play between the threads. It will be noted that the first and second members mentioned above include generally tubular members having a common axis of symmetry and that the ramp preferably has a surface of generally truncated conical shape relative to which and adjacent the base which is provided a recess in the first member. The second member includes at least one radially extending part extending at least partly radially relative to the axis of symmetry to be received in the recess with the tubular member bearing against the ramp.

Figure 11:
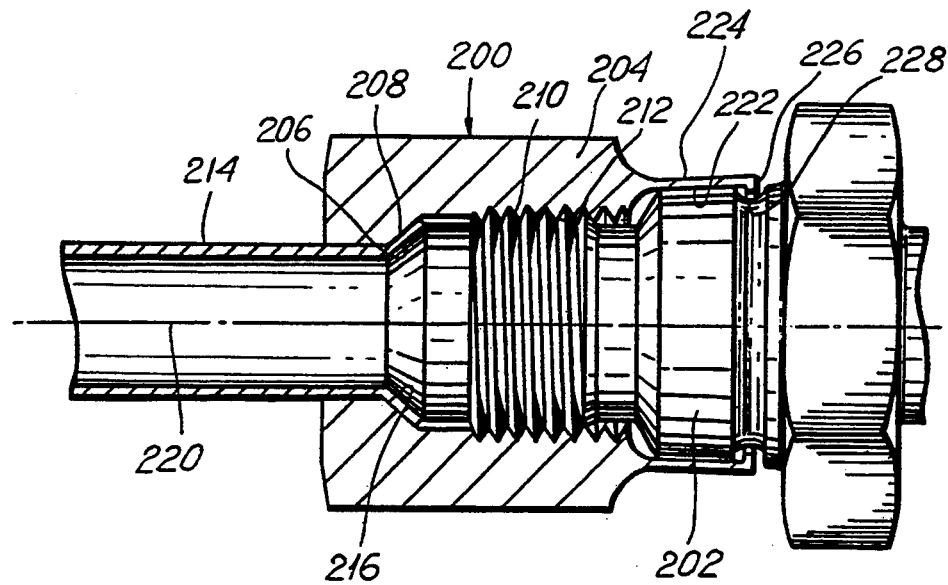
FIG. 11 is a fragmentary partly cross-sectional view of a fitting provided in accordance with another embodiment of the invention.

Referring next to FIG. 11, there will be seen a fitting wherein the tubular members of the first and second members include facing conical surfaces having a proximity controlled by adjustment of the interengaged threads. Cooperating with the fitting is a tube including a flared end and portion entrapped between these conical surfaces with the radially extending part received in the recess. The threads, ramp and conical surfaces are coaxial relative to the axis of symmetry and the recess, as in the prior embodiments, is preferably an annular groove. In this embodiment, a dry lubricant (e.g. Everlube 811 or Esnalube 832) is preferably provided on one of the conical surfaces between the nut and the aforementioned tube. This prevents the tube from rotating when the nut second member is tightened on the first member.

With more particular reference to FIG. 11 the rifling is indicated generally at 200, there being a first member 202 and a second member or nut 204. The fitting may further include at least one additional arrangement of members in mirror relationship to that illustrated. In this embodiment of the invention, the first member has a conical surface 206 which faces the conical surface 208 on the interior of the second member 204. The member 204 has an interior thread 210 whereas the first member has an exterior thread 212. These threads are interengaged to hold the first and second members together.

Cooperating with the fitting is the tube 214 which is preferably a high pressure tube of a material such as plastic, metal or rubber. This tube has an end section 216 which is entrapped between the facing conical surfaces 206 and 208 with a force which is controllable by adjustment of threads 210 and 212. The threads 210 and 212 and the conical surfaces 206 and 208 are coaxial relative to an axis of symmetry 220. This axis also serves as the axis of symmetry for the ramp 222 which is formed on the first member 202 to cooperate with the tubular member 224 of the second member 204 to provide a force the axial vector of which forces the threads 210 and 212 together thereby to remove the possibility of play between the same. It will be noted that, corresponding to previously mentioned embodiments, the tubular member 224 includes a radially extending part 226 which is accommodated loosely within the annular groove 228 whereby to provide a lock preventing the member 204 from becoming separated from the member 202.

In this embodiment of the invention, a dry lubricant is provided for example on the conical surface 208 on the inside of the nut or second member 204. The purpose of this dry lubricant is to prevent the tube 214 from rotating when the nut 204 is being tightened on the first member 202 as might otherwise occur during adjustment of the interengaged threads 210 and 212. It will be noted that, in this embodiment, there is no ferrule and the members 202 and 204 cooperate directly through conical surfaces 206 and 208 to engage end section 216 and 214.

Figure 12:
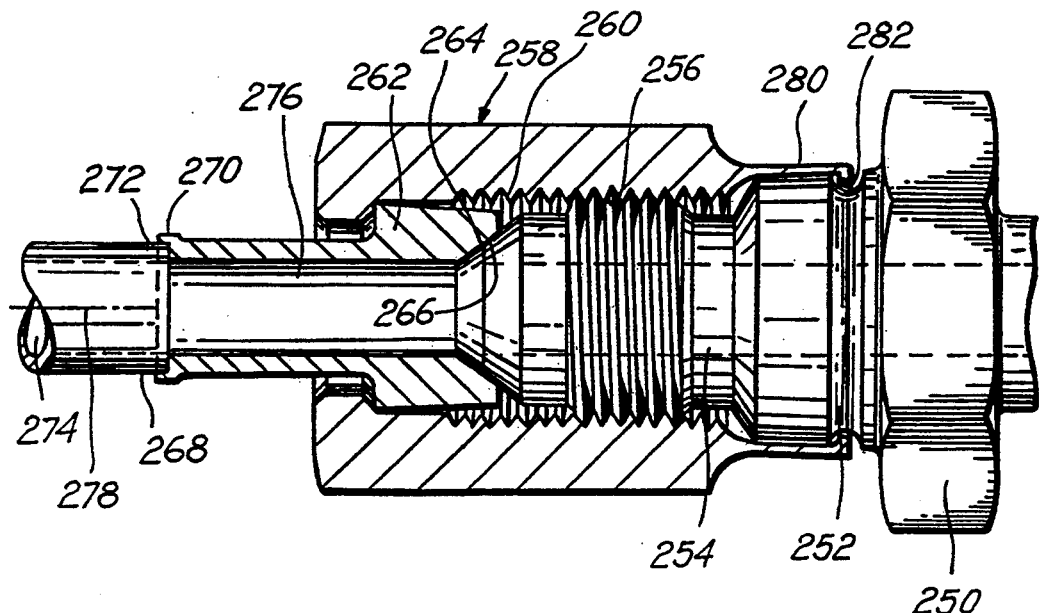
FIG. 12 is a fragmentary partly cross-sectional view of another fitting provided in accordance with a further embodiment of the invention.

FIG. 12 shows still a further embodiment of the invention which in contrast to the embodiment of FIG. 11 comprises a ferrule. In this embodiment of the invention the ferrule and the first member mentioned above include facing conical surfaces. The second member engages the ferrule and it responsive to adjustment of the threads to displace the conical surface on the ferrule towards the facing conical surface on the first member. In this embodiment, the tube which is part of a pneumatic or hydraulic circuit is connected directly to the ferrule and defines therewith a continuous bore providing for a flow of the medium. The tube and ferrule are preferably connected in endwise abutting relationship although and overlapping or telescopic type engagement is also possible. Also in this embodiment of the invention, the facing conical surfaces are in contacting relationship with the radially extending part received in the aforementioned recess.

With more particular reference to FIG. 12, it will be seen that the fitting includes a central portion 250 adjacent which is an annular recess 252 provided in the first member 254 which as in the aforegoing embodiments of the invention is provided with an exterior thread 256. The nut of this fitting is indicated at 258 and is provided with an interior thread 260 which is interengaged with the thread 256. According to this embodiment, there is provided a ferrule 262 having an interior conically shaped surface 264. The surface is intended to come into direct engagement with the matching conical surface 266 provided on the first member. There is no intervening part or member. Since the tube 268 is not entrapped between the aforementioned conical surfaces, provision is made for engaging the end 270 of ferrule 262 with the end 272 of the tube 268. Connection is made by welding or brazing. For this purpose, the tube 268 is preferably formed of a metallic material such as, for example, stainless steel or copper. The tube 268 is provided with a bore 274 which is continuous with the bore 276 provided within the ferrule 26. These bores are preferably coaxial relative to an axis of symmetry 278 which is furthermore the axis for surfaces 264 and 266 as well as annular recess 252. The axis 278 is furthermore the axis of symmetry for the part 280 which includes the radially extending part 282 which is received in the annular recess 252. Thus the invention provides for an embodiment where the tube to be connected with the fitting is not entrapped between conical surfaces the proximity of which is controlled by adjustment of associated threads.

Referring next to the embodiment of the invention illustrated in FIG. 13, it is seen that the second member referred to hereinabove includes a main section provided with an endwise opening recess and an auxiliary section separate from the main section and located in this endwise opening recess. The auxiliary section supports the arrangement for generating the force the vector of which presses the threads together and there is once again a radially extending part to be received in an annular recess as will be shown. The main section has a polygonal periphery concentric on the axis of symmetry of the fitting to facilitate adjustment of the threads. The main and auxiliary sections abut along a plane which is perpendicular to the axis of symmetry of the fitting.

Figure 13:
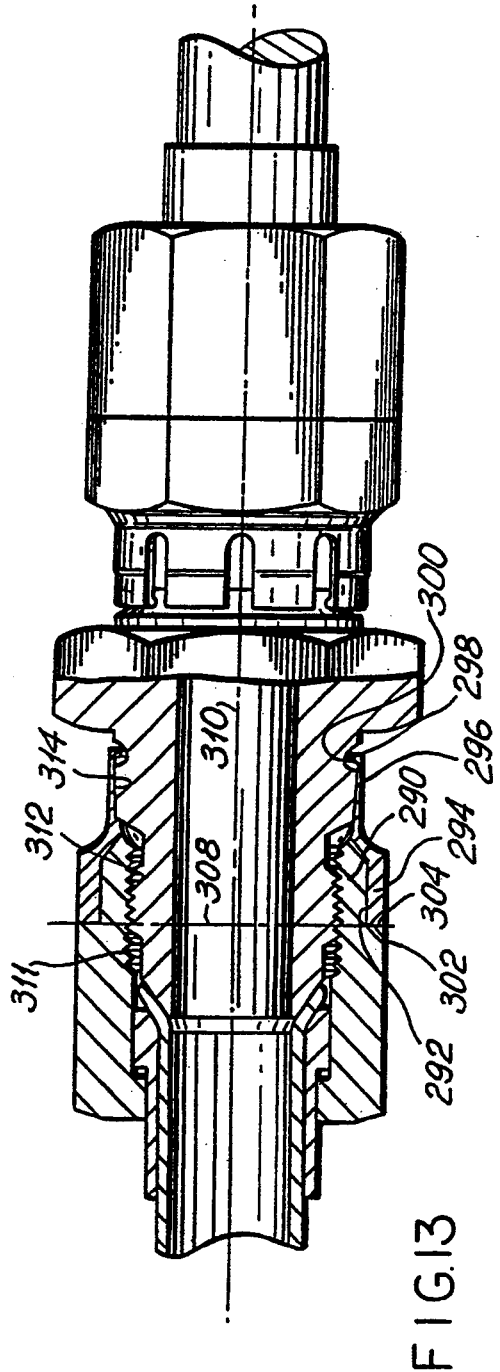
FIG. 13 is a fragmentary partly cross-sectional view of still a further embodiment of the invention.

Referring in greater detail to FIG. 13, it will be seen that the main section of the nut is indicated at 290. On the periphery nut 290 is provided an endwise opening recess 292. In this recess is accommodated a polygonal shaped part 294 which functions to support the force generating member 296 provided with the radially extending part 298 accommodated in annular recess 300. The main part 290 and its recess 292 are provided with a planar surface indicated at 302, there being a matching surface 304 provided on the auxiliary member 294. All of these surfaces abut along a plane 308 which is perpendicular to the axis of symmetry 310. The purpose of this abutment is to enable a tightening of threads 311 and 312 to generate a force which urges the force generating member 296 along ramp 314 so that the radially extending member 300 comes to be accommodated in the annular recess 298 as has been described hereinabove. Once again, the force generating member 296 due to its engagement of ramp 314 generates a vectored force which operates to force the threads 311 and 312 together thereby to remove play from this engagement.

Figure 14:
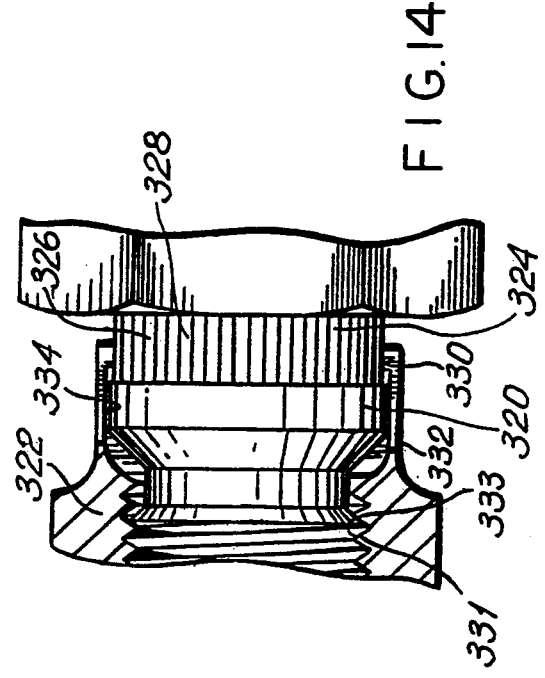
FIG. 14 is a fragmentary party sectional view of yet another embodiment of the invention.

According to the embodiment of the invention illustrated in FIG. 14, the aforementioned annular recess is provided in the form of a toothed groove which includes teeth defining notches therebetween. In the event that a plurality of radially extending parts is provided, all of these parts are adapted for being received in the aforementioned notches. As will be shown, the aforesaid notches are parallel to the axis of symmetry of the fitting. As will also appear hereinafter, the second members includes a cylindrical barrel including an end portion provided with parallel slots. The end portion thereby includes axially aligned cantilever fingers between the slots, these fingers including radially extending parts. These parts are received in the notches to restrict relative rotation between the first and second members. The parallel slots in the barrel are of a relatively shallow depth and it is principally the barrel which engages the ramp with the radially extending parts at the same time being located in the notches. The barrel is, for this purpose, made of a material which enables the barrel to be radially and circumferentially expansible.

The engagement of the barrel on the ramp can result in a hoop type stress in the barrel and this embodiment functions best when E/St=approximately 150 and $S=(/\Delta R)E/R$ $$P=\Delta R(E)E/R$$

wherein
S=Hoop stress in the barrel
$\Delta$ R=maximum interference of barrel or radially extending part with the ramp
E=modulus of elasticity of the barrel material and
t=wall thickness of the barrel.
P=contact pressure between the barrel and the ramp.

Referring more particularly to FIG. 14 wherein is seen the first member 320 and the second member 322, the member 320 is provided with the annular recess 324. In the recess are provided a plurality of teeth 326 between which are notches 328. The radially extending portions 330 on barrel 332 enter into notches 328 thereby restricting relative rotation between members 320 and 322. In other respects the embodiment of FIG. 14 will function in the manner described hereinabove such that adjustment between threads 331 and 333 entrap the end portion of a tube of hose thereby to couple the same to the fitting illustrated in FIG. 14. In this embodiment, by way of example, the barrel wall thickness of part 332 may be, for example, 0.010 inches which will cooperate with a ramp 334 having a 0.5° taper. Materials suitable for forming the barrel 322 may include: Inconel, titanium (6A14V), aluminum 7075T6, Torlon 7130, PEEK, Valox 508 and Vespel.

Figure 15:
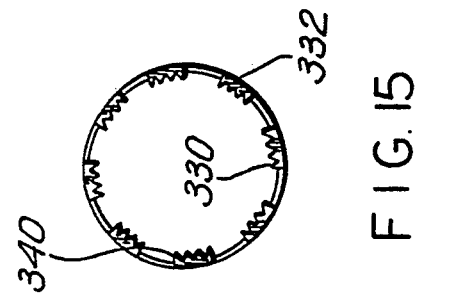
FIG. 15 is an end view of a component incorporated in the embodiment of FIG. 14.

As seen in FIG. 15, the radially extending members may include serrated extremities for engaging the teeth in the annular groove. More particularly appearing in FIG. 15 is the barrel 332 supporting cantilever members provided with radially extending parts 330 having serrated extremities 340. The serrations on extremities 340 are matched to the serrations in the grove 324 thereby enabling the radially extending parts to engage the teeth 326 (see FIG. 14) to restrict relative rotation between first and second members 320 and 322.

Figure 16:
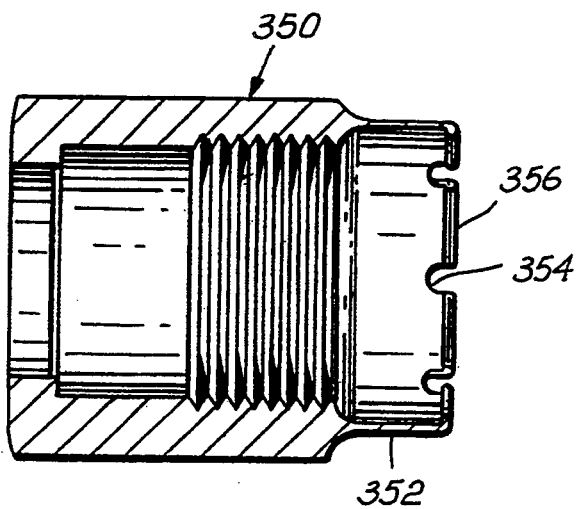
FIG. 16 is a sectional view of yet another component of the embodiment of FIG. 14 as well as other embodiments of this invention.

FIG. 16 illustrates in cross-sectional view a nut 350 constituting a second member of a fitting provided in accordance with the invention. In accordance with what has been described above, this nut includes a cylindrical barrel section 352 provided with a plurality of equally spaced shallow slots capable of supporting radially extending members 356. The distinction which this embodiment of the invention has relative to some of the other embodiments is that the relatively shallow slots are not intended to provide cantilever fingers which are capable of riding up a ramp in the associated fitting (although such engagement may occur). Rather, in this embodiment of the invention, it is the barrel shaped cylinder which is intended to engage the ramp and provide the vectorable forces which are capable of forcing the threads together between the engaged first and second members. None-the-less, the barrel shaped cylinder is provided with radially extending pads 356 intended to engage in the annular recess or groove and these radially extending parts do engage the ramp as the parts are being brought together. As with the other embodiments of the invention, however, when the first and second members are fully engaged by virtue of their interengaged threads, the radially extending members and the bulbous extremities thereon are intended to be accommodated within an annular groove thereby to lock the first and second members together.

Figure 17:
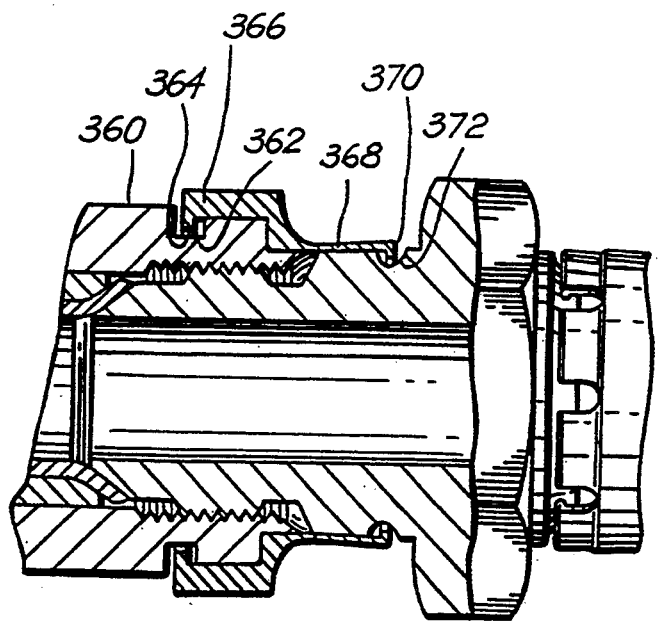
FIG. 17 is a fragmentary partly sectional view of a fitting provided in accordance with yet another embodiment of the invention.

Referring next to FIG. 17, it is seen that the second member once again may include first and second separable pads. The first part which is the main part is provided with an annular groove and the second part includes one or more protrusions to engage in the annular groove to hold the first and second parts together. With more particular reference to FIG. 17, it is seen that main part 360 is provided with annular groove 362 into which extends the radial extension 364 of an annular auxiliary part 366. The auxiliary part 366 supports the barrel or cylinder 368 which in turn supports the radially extending parts 370 which extend into the annular groove 372 to function as has been indicated hereinabove.

FIG. 18 shows a diagrammatic perspective view of a nut portion corresponding to the part 366 in FIG. 17. Therein, it is seen that the part 366 includes a cylindrical portion 368 provided with a plurality of relatively shallow slots 370 enabling the resilient support of radially extending parts 372 adapted for being accommodated in the annular groove of the first member of the fitting as described hereinabove.

In this view it is also seen that the part 366 is provided with a plurality of equally spaced axially aligned slots 380 thereby dividing the nut into a plurality of cantilever parts 382 on which are mounted the tabs 384 which are adapted to be accommodated in the annular groove 364 as shown in FIG. 17.

FIG. 19 illustrates an arrangement similar to that shown in FIG. 18 except that there is provided a circular arrangement of flags adapted to extend into the annular recess, these flags sloping in the same circumferential direction so as to engage in the recess to resist rotational displacement between the first and second members after a certain desired displacement has been effected. These flags include staffs in extension of the tubular member of the second member and connected to the same. These flags extend to generally the same extent into the recess.

Referring more particularly to FIG. 19, there appears therein the barrel member 390 having staffs 392 extending axially from the end 394 of the barrel 390. Mounted on these staffs are the flags 396 having sections 398 extending in a somewhat radial direction towards the axis of symmetry of the structure. The sections 398 are engaged on the frusto-conical ramp in the first member of the fitting thereby to provide a lock preventing disengagement between the first and second members of the fitting. It is also possible in accordance with certain embodiments of the invention that the section 398 engage in notches between teeth provided in the annular recess all as described hereinabove. Further seen in FIG. 19 are tabs 400 mounted on the axial extremities of the flags 396, tabs 400 also being adapted to engage loosely in the annular recess provided in the first member of the fitting.

In FIG. 19, it will be noted that the second member of the fitting is divided into two parts with one of the parts being provided with a polygonal periphery indicated at 402. To engage therewith is provided a part 404 provided with an opening which is also of a polygonal configuration thereby to enable the parts 402 and 404 of the illustrated structure to function as a unitary whole after being interengaged with one another.

FIG. 20 illustrates a variation of the structure illustrated in FIG. 19. Herein the flags 396 are provided with terminal edges 408 from which tabs are absent. In this embodiment of the invention, the flag sections 398 are intended to engage the frusto-conical ramp or the annular recess in the first member of the fitting without requiring the additional assistance of the tabs to provide the lock whereby the first and second members of the fitting are held together. The flags of FIGS. 19 and 20 form locking beams which are deformed to produce a cam action on the associated ramps in the associated fittings according to the above embodiments. In accordance with the structure illustrated it is possible for the flags to be spaced from the end edge 394 of barrel 390 to form undercut openings 410.

In the above was described a concept which utilized fingers (beams) on a nut, which experienced the highest stress when being installed over a ramp (at maximum lift). The stress, after installation, was less, since the installed stress is decreased by the ratio of installed deflection divided by the deflection during installation. The maximum beam stress was kept below the elastic limit, and thus provided for thousands of reuses. For some uses, it may be desired that the nut must not be able to be hand tightened up the ramp. This requires that the nut beams be made stiffer and the stress during installation and after installation to be much higher. This produces beam stresses in the plastic range, but satisfies a "wrench to tighten the nut" requirement. The number of turns to move the nut a given axial distance is determined by the pitch of the threads. The pitch may be determined for each tube size, for example, by a MIL-Spec document. For instance, the MIL-Spec shows that for a $-04$ size ($\frac{1}{4}$"tube) the thread will be 0.4375-20 UNJF-3A. The 20 thread per inch pitch means that each complete revolution of the nut will produce an axial displacement of 1/20 or 0.050 inches. If the ramp is, for example, 0.096 inches long, it requires $0.096/0.050 = 1.92$ of the nut (and therefore the wrench) to advance up the ramp and tighten the fitting. A short ramp (e.g., 0.050 long) requires $0.050/0.050 = 1$ turn of the wrench to tighten the fitting with a 0.04375-20 UNJF thread. The coarsest thread, 1.3125-12UNJ-3A, used on the $-16$ or, 1 inch tube size, has an advance of 1/12 or 0.0833 inch per turn of the nut. For a 0.050" ramp, $0.050/0.083 = 0.6$ wrench turns would be required.

Figure 21:
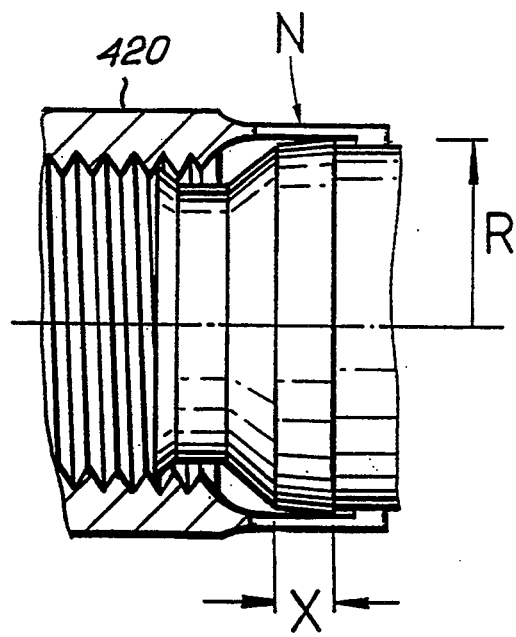
FIG. 21 illustrates torque developed with a ramp of given extent.
Figure 22:
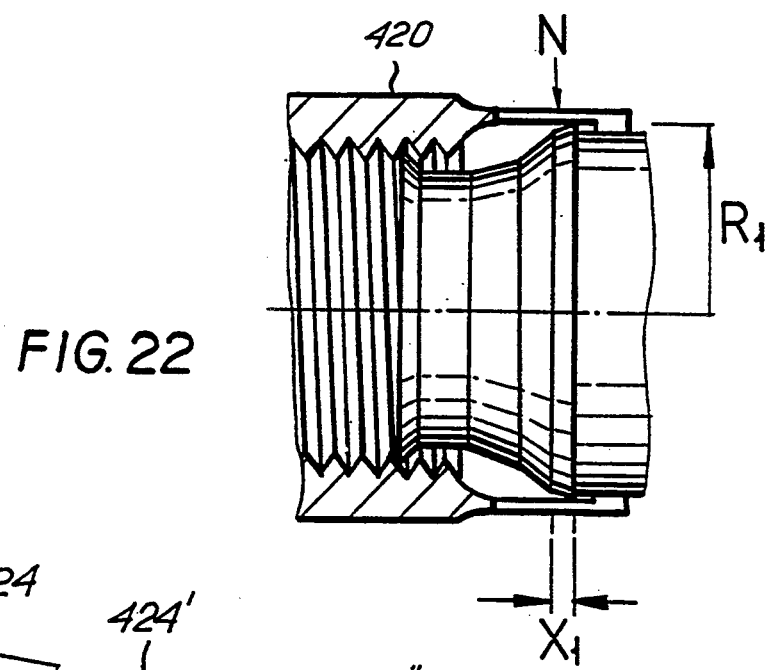
FIG. 22 illustrates torque developed with a ramp of narrower extent.
Figure 23:
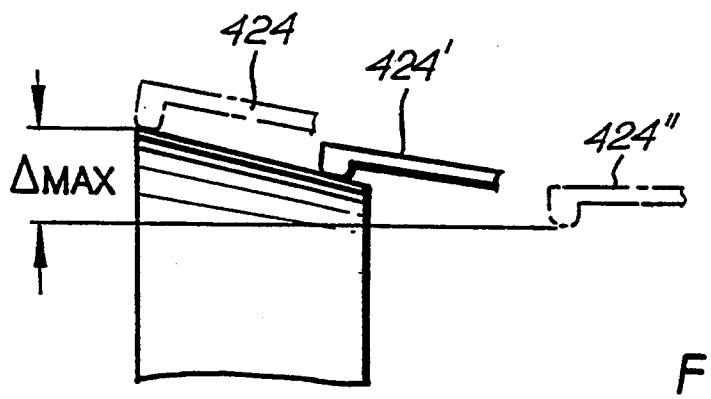
FIG. 23 diagrammatically illustrates deflection.

This advantage is primarily advantageous in limited space installations, where wrench access is restricted. It also serves to reduce installation and tightening time, even where there is ample wrench space available. Relative to FIG. 21, the torque that contributes to vibration resistance to the backing off of nut 420 is defined as follows:

$$\text{Torque} = MNR$$

wherein
M = coefficient of friction nut leaf on ramp
N = Normal force caused by deflection of the nut beam
R = Average radius Since the friction force is independent of the contact area, reducing the axial length of the ramp from ($x$ to $x_1$) has no negative effect and will, in fact, increase the effective radius of the force from R to $R_1$ and increase the torque, even with the same beam deflection force. In FIGS. 21 and 22 the normal force is a function of nut beam 424 deflection (FIG. 23). For a cantilever beam in the elastic range, the deflection $\Delta$ is calculated by:

$$\Delta = \frac{Nl^3}{3EI} \quad \text{Equation (1)}$$

and $$s = \frac{Mc}{I} \quad \text{Equation (2)}$$

N=applied load at end of beam
l=length of beam
I=area moment of inertia of cross-section
c=distance from neutral axis of cross-section to the outer-most fiber
M=applied moment—for a cantilever with an end applied load=Nxl
$\Delta$ =deflection
S=stress This shows that the beam deflection is directly proportional to the load. Different deflections during installation are shown at 424' and 424".

For the case of the plastic range, while the force N, and therefore stress may not be directly proportionally to the deflection, an increase in deflection will produce an increase in force.

There will now be obvious to those skilled in the art many modifications and variations of the structures set forth hereinabove. These modifications and variations will not depart from the scope of the invention if defined by the following claims.

What is claimed is:

1. A fitting comprising first and second members including interengaged first and second threads, said first member including a ramp, said second member including an arrangement adapted by adjustment of the interengaged threads for being brought to bear against said ramp to generate a force to maintain the threads in tightly engaged relationship thereby to avoid play between the threads, said members including generally tubular members having a common axis of symmetry, said ramp having a surface of generally truncated conical shape and having a base, said first member being provided with a recess adjacent said base; said second member including at least one radially extending part extending at least partly radially relative to said axis to be received in said recess with the tubular member bearing against said ramp.

2. A fitting as claimed in claim 1, wherein the tubular members of said first and second members include facing sloped surfaces having a proximity controlled by adjustment of said interengaged threads.

3. A fitting as claimed in claim 2, comprising a tube including an end portion entrapped between said sloped surfaces with said radially extending part received in said recess.

4. A fitting as claimed in claim 3, wherein said threads, ramp and sloped surfaces are coaxial relative to said axis of symmetry.

5. A fitting as claimed in claim 3, wherein said recess is an annular groove.

6. A fitting as claimed in claim 3, comprising a dry lubricant on said ramp.

7. A fitting as claimed in claim 2, further comprising a ferrule, said ferrule and first member including facing sloped surfaces, said second member engaging said ferrule and being responsive to adjustment of said threads to displace said ferrule and the sloped surface on the ferrule towards engagement with the facing sloped surface on the first member.

8. A fitting as claimed in claim 7, comprising a tube connected to the ferrule and defining therewith a continuous bore.

9. A fitting as claimed in claim 8, wherein the tube and ferrule are connected in endwise abutting relation.

10. A fitting as claimed in claim 8, wherein the facing sloped surfaces are in abutting relationship when said radially extending part is received in said recess.

11. A fitting as claimed in claim 2, wherein said second member includes a main section provided with an endwise opening recess and an auxiliary section separate from said main section and located in said endwise opening recess, said auxiliary section supporting said arrangement for generating said force and to enable said radially extending part to be received in the recess in said first member.

12. A fitting as claimed in claim 11, wherein said main section includes a polygonal periphery concentric on said axis to facilitate adjustment of said threads.

13. A fitting as claimed in claim 11, wherein said main and auxiliary sections abut along a plane which is perpendicular to said axis.

14. A fitting as claimed in claim 2, wherein said recess is in the form of a toothed annular groove including teeth defining notches therebetween, said radially extending part being adapted for being received in said notches.

15. A fitting as claimed in claim 14, wherein said notches are parallel to said axis.

16. A fitting as claimed in claim 15, wherein said second member including a cylindrical barrel include an end portion provided with parallel slots, said end portion including axially aligned cantilever fingers between the slots, said fingers including radially extending parts inclusive of the first said radially extending part, said radially extending parts being received in said notches to restrict relative rotation between said first and second members.

17. A fitting as claimed in claim 16, wherein said parallel slots are of a relatively shallow depth and wherein said barrel engages said ramp with the radially extending parts in said notches.

18. A fitting as claimed in claim 17, wherein $$\frac{E}{St} = \text{approximately } 150$$

$$S = \frac{(\Delta R)Et}{R}$$

in which:
S=stress in barrel
$\Delta R$=maximum interference of barrel or radially extending part with ramp
E=modulus of elasticity of barrel
t=wall thickness of barrel.

19. A fitting as claimed in claim 16, wherein the radially extending parts include serrated extremities for engaging the teeth in said annular groove.

20. A fitting as claimed in claim 2, wherein said second member includes first and second separable parts, said first part including said second thread in the form of an interior thread, said second part including a circular array of radially extending parts including the first said radially extending part.

21. A fitting as claimed in claim 20, wherein said first part is provided with an annular groove, said second part including a protrusion to engage in the annular groove in the first part to hold said first and second parts together.

22. A fitting as claimed in claim 21, wherein said protrusion is one of a plurality of tabs on said second part, said tabs engaging in said annular groove in said first part.

23. A fitting as claimed in claim 22, wherein said second part is provided with a plurality of slots between said tabs to enable said tabs to snap into the annular groove in said first part.

24. A fitting comprising first and second members including interengaged first and second threads, said first member including a ramp, said second member including an arrangement adapted by adjustment of the interengaged threads for being brought to bear against said ramp to generate a force to maintain the threads in tightly engaged relationship thereby to avoid play between the threads, said members including generally tubular members having a common axis of symmetry, said ramp having a surface of generally truncated conical shape, and including a base, said first member being provided with a recess adjacent said base; said second member including a circular arrangement of flags adapted to extend into said recess, said flags sloping in the same circumferential direction to engage in said recess.

25. A fitting as claimed in claim 24, wherein said flags include staffs in extension of the tubular member of the second member and connected to the latter, said flags extending to generally the same extent into said recess.

26. A fitting as claimed in claim 25, wherein the tubular member of said second member includes a diametrically stretchable barrel adapted to ride up said ramp.

27. A fitting as claimed in claim 26, wherein the barrel is of metal or plastic.

28. A fitting as claimed in claim 27, wherein the barrel is of Inconel, titanium, aluminum, Torlon, PEEK, Valox or Vespel.

29. A fitting as claimed in claim 25, wherein said flags include tabs extending radially towards said axis.

30. A fitting as claimed in claim 24, wherein the tubular member of the second member includes two sections one of which includes a polygonal periphery and the other of which is provided with a matching polygonal bore, said periphery extending into said bore.

31. A nut adapted for engaging a fitting part, said nut comprising a tubular section including opposite end portions, fingers on and in extension of one of said end portions and separated by slots, and extensions on said fingers extending radially inwards therefrom, said tubular section including an interior thread, said tubular section including a main tubular section and a separable auxiliary section interengaged with said main tubular section and supporting said fingers and extensions, said tubular section being provided with an annular groove and said auxiliary section including a radial projection engaging in said groove.

32. A nut as claimed in claim 31 wherein said auxiliary section includes at least one cantilever section supporting said radial projection.

33. A nut adapted for engaging a fitting part, said nut comprising a tubular section including opposite end portions, fingers on and in extension of one of said end portions and separated by slots, and extensions on said fingers extending radially inwards therefrom, said tubular section including an interior thread, said tubular section including a main tubular section and a separable auxiliary section interengaged with said main tubular section and supporting said fingers and extensions, said extensions and fingers being respectively in the form of flags and staffs therefor.

34. A nut as claimed in claim 33 wherein said flags support tabs extending radially inwards therefrom.

35. A nut as claimed in claim 33 wherein said flags include sections sloping both circumferentially and radially inwards.

36. A structure for providing a coupling for a tube-like member, said structure comprising first and second means for providing said coupling with the tube-like member, said first and second means including interengaged threads, one of said means including a ramp, said ramp being fixed relative to the thread on the means including the ramp, the other of said means including a resilient member coupled to the thread on the means including said resilient member, said resilient member engaging said ramp to generate a friction torque to resist detaching movement between the threads and to generate a force to minimize play between the threads, said first means being effective to lock said tube-like member to said second means to create a pressure seal therewith, and a ferrule-like member operatively interposed between the first and second means and being displaceable by said first means to force said tube-like member against said second means.

37. A structure as claimed in claim 36 wherein said resilient member includes a thin wall cylinder encircling said second means and adapted to slide up said ramp.

38. A structure as claimed in claim 37 wherein said second means is provided with a groove and said cylinder includes a projection adapted to move past the ramp upon adjustment of the threads and to fall into said groove.

39. A structure as claimed in claim 37 wherein the first and second means and tube-like member have a common axis of symmetry.

40. A structure as claimed in claim 36 wherein said resilient member includes a cylindrical arrangement of cantilever fingers encircling said second means and adapted to slide up said ramp.

41. A structure as claimed in claim 40 wherein said second means is provided with a groove and said fingers include projections adapted to move past the ramp upon adjustment of the threads and to fall into said groove.

42. A structure as claimed in claim 40 wherein the first and second means and tube-like member have a common axis of symmetry.

* * * * *